Feb. 27, 1951   J. W. PHILIPPOVIC   2,543,126
VALVE MECHANISM FOR POWER DRIVEN RAMMERS AND PILE DRIVERS
Filed July 31, 1947   2 Sheets-Sheet 1

INVENTOR: Joachim W. Philippovic
By Francis E. Boyce
ATTORNEY

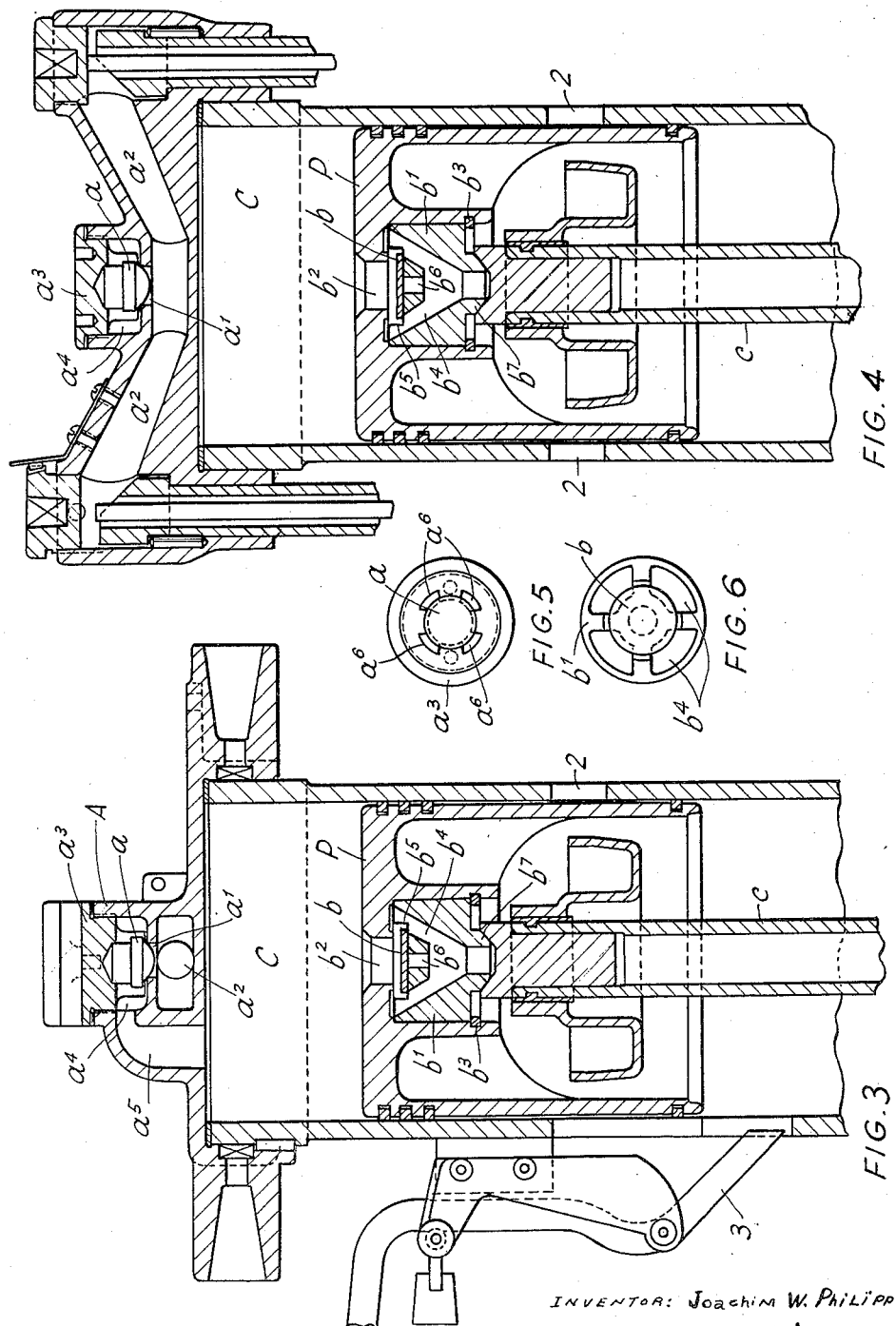

Patented Feb. 27, 1951

2,543,126

UNITED STATES PATENT OFFICE 2,543,126

VALVE MECHANISM FOR POWER-DRIVEN RAMMERS AND PILE DRIVERS

Joachim Wolfgang Philippovic, Staines, England, assignor to C. H. Johnson & Sons, Limited, Manchester, England Application July 31, 1947, Serial No. 764,961
In Great Britain December 9, 1940

Section 1, Public Law 690, August 8, 1946
Patent expires December 9, 1960

6 Claims. (Cl. 127—7)

This invention relates to the valve mechanism of certain internal combustion driven percussive tools, that is, power driven rammers and pile drivers of a certain type, and is concerned with the provision and use of purely automatic springless inlet and exhaust or scavenging valves, or valve discs, which are operated and controlled by pressure variation and for that type of power rammer or pile driver wherein a free or movable piston co-operates and works in connection with a loose piston rod attached to a striker foot or equivalent.

In certain known constructions of such apparatus to which this invention relates there is an inlet valve in the cylinder head casting; and an exhaust or scavenging valve in the free or movable piston.

The devising of and use of automatic springless inlet and exhaust or scavenging valves operated or controlled by pressure variation in connection with power driven rammers and pile drivers of the indicated type is believed to be new.

Various constructions of valves are known and used but in all cases the inlet and exhaust or scavenging valves (fitted in the cylinder head and piston respectively) are spring-loaded either by direct contact of the spring or springs with the valve, or through a lever arrangement, and do not depend for operation or control both ways by pressure variation against valve discs, as is herein set forth.

The use of springs in connection with such inlet and exhaust or scavenging valves for apparatus of the type indicated has serious drawbacks, such as liability to breakage, and difficulty in obtaining reliable springs, and the invention has for direct object the provision and use of automatic springless inlet and exhaust valves which are operated or controlled by pressure variation on said valves and for the stated apparatus.

The inlet valve is fitted in the cylinder head casting and the exhaust or scavenging valve in the piston, the actual location of valves being known in the type of internal combustion rammer or pile driver in question.

In the accompanying drawings:

Fig. 3 shows an enlarged sectional view of the upper part of the apparatus, and shows the inlet valve closed and the movable piston in contact with the loose piston rod.

Fig. 4 is an enlarged sectional view at right-angles to Fig. 3, and shows the parts in the same position.

Fig. 5 is an enlarged detail bottom view of the inlet valve and retaining plug therefor;

Fig. 6 is an enlarged detail top plan view of the exhaust valve and cage therefor.

Figure 1:
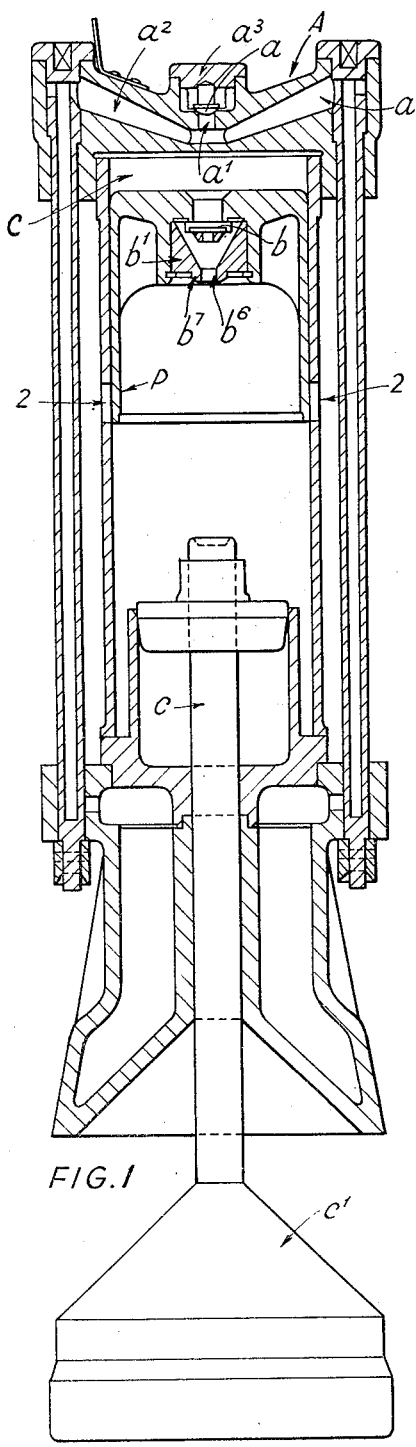
Fig. 1 shows a general sectional view of an internal combustion rammer or pile driver having inlet and exhaust or scavenging valves, etc. in accordance with the invention. In this Fig. 1 the explosion has taken place, and the machine is moving upwards, the inlet valve being closed and the exhaust or scavenging valve open.

To deal firstly with the automatic springless inlet valve, this is lettered $a$. It is located in the cylinder head casting A and is shown as a disc valve with slightly rounded under-face and is disposed over an aperture $a^1$ in a web in the cylinder head casting A. Under the aperture $a^1$ is a cored passage way, two being shown and marked $a^2$, which passage ways allow the fuel and air mixture from the carburetter and passing up the hollow stays from the carburetter in known way, to come under the disc valve $a$. The disc valve $a$ is shown held in position in its housing by a screwed-in plug $a^3$ with packing, which plug serves to seal the top bore hole in the cylinder head casting, holds the disc valve $a$ in a cage-like contrivance, and limits the lift of the disc valve $a$. The lower part of the plug $a^3$ is castellated or apertured at $a^6$ (see the detail view Fig. 5) to allow the fuel mixture to pass into a ring chamber $a^4$ when the disc valve $a$ lifts off its seating. The ring chamber $a^4$ is in communication with the combustion chamber C by a cored passage way $a^5$. Normally the disc valve $a$ lies against its seating under gravity load. When the piston P sucks the fuel and air mixture from the carburetter into the combustion chamber C, the disc valve $a$ lifts to a pre-determined height, and the fuel mixture via the bored aperture $a^1$ in the web of the cylinder head casting travels past the disc valve $a$ into and around the ring chamber $a^4$ along the cored passage way $a^5$ and so reaches the combustion space C. On completion of the suction stroke, the disc valve $a$ falls back into its closed position thus sealing the combustion chamber. The combustion pressure keeps the disc valve $a$ tightly closed until the suction stroke recurs.

Respecting the automatic springless exhaust or scavenging valve marked $b$, this is located in the head of the movable piston P. The arrangement, as illustrated, consists of a valve cage $b^1$ fitting inside a downwardly disposed housing on the underside of the piston crown, such cage $b^1$ being in communication with the top face of the piston through a transfer passage $b^2$. The exhaust valve cage is shown held in place by a snap ring $b^3$ engaging a groove in the bored boss of the piston. It may be held in place in other simple ways. The valve cage $b^1$ has a number of holes $b^4$ forming a transfer passage drilled at an angle downwards from the cage top and converging to the centre of the cage $b^1$ and separated at their upper ends by radiating webs. There is a recess $b^5$ at the top of the cage $b^1$ and a vertical hole $b^6$ through the central web of metal of the cage $b^1$. In the recess $b^5$, lies loosely, the exhaust disc valve $b$. The transfer passage $b^2$ in the head of the piston is smaller than the diameter of the disc valve $b$, and the underneath face of the piston head adjacent the disc valve $b$ can be concentrically recessed to provide a protruding rim against which the disc valve $b$ can seat when raised. The purpose of this is, to prevent sticking of the disc valve due to oil or carbon deposits and to provide an accurate seating surface.

The top of the loose piston rod $c$ connecting with the rammer foot $c^1$, or like blow-striking structure, presses against the bottom of the valve cage $b^1$ at the proper times, thus closing the passage way at the base of such valve cage. The projecting central foot $b^7$ of the cage, and the top of the loose piston rod $c$ are shaped to ensure effective closure.

For exhausting or scavenging of spent gases and other purposes, the movable piston with cage and disc valve is automatically disengaged from the piston rod $c$ according to the known way of working. Consequently, spent gases above the piston can go through the transfer passage $b^2$ and passage ways past the disc valve (which during this part of the cycle lies at the bottom of the recess in the valve cage) through the inclined holes in the valve cage and out of the central hole at the bottom of the valve cage. When the piston ascends, due to the action of compressed air and its momentum (in the example illustrated) it uncovers the exhaust outlets 2 and spent gases escape.

Figure 2:
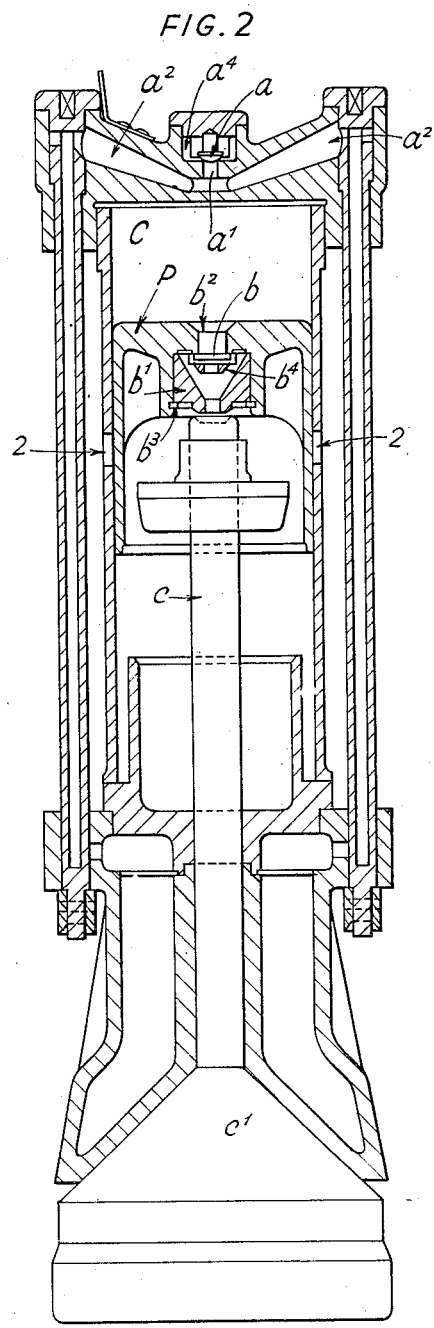
Fig. 2 is a sectional view with the parts approaching a normal or collapsed position, the inlet valve being open and the exhaust or scavenging valve closed, the suction stroke being almost completed.

During the suction stroke of the piston, which occurs in known way, the disc valve $b$ is lifted upwards to its seating (see Fig. 2) by the suction created by the vacuum action on top of the piston and by the air pressure underneath the piston passing upwards through the central hole or bore in the valve cage. Thus, during the suction stroke the disc valve $b$ seals the piston and the lower part of the combustion chamber.

When the piston again comes to bear against the top of the piston rod $c$ at the end of the suction stroke, the top of the said rod seals the combustion chamber against pressure by closing the central hole or bore in the valve cage.

The invention enables us to make use of automatic springless inlet and exhaust or scavenging valves which are efficient and suited to the type of apparatus specified and it is seen that such valves are operated by varying pressure against the actual disc valves. The weight and area of the disc valves can be so balanced as to allow them to float if pressure rises or falls unduly.

The construction described involves few working parts, and all of such are at once simple and robust and adapted to stand-up to the heavy service required in apparatus of the indicated character.

Protruding rims or ridges may be provided for the seats of either of the disc valves, or on the disc valves themselves where possible.

The working of the power driven rammer or pile driver apart from the springless valve contrivances and their arrangement for use are known, but, for convenience of understanding by the reader it is mentioned that in the showing Fig. 1, the rammer structure is supposed to be moving upwards, the inlet valve $a$ is closed, and the exhaust or scavenging valve $b$ is open for exhaust and scavenging of spent gases into the lower part of the cylinder. The piston is still moving upwards due to the action of compressed gases and momentum, and the suction stroke follows thereafter, the position of the piston just before the end of the suction stroke being indicated in Fig. 2 where the piston is ready to seal to the loose piston rod. Ignition takes place and the cylinder and piston separate relatively, uncovering the known main exhaust ports 2. Thereafter, the piston moves upwards and is continuing so to do (as in Fig. 1) leaving the exhaust or scavenging valve open for exhaust or scavenging until the piston reaches its highest position (again uncovering the known exhaust ports 2) whereupon the suction stroke recurs, and with descent of the piston the exhaust or scavenging valve $b$ closes (Fig. 2) and towards the end of the suction stroke the piston seals to the loose piston rod. Fresh air can enter into the lower part of the cylinder and below the piston for a period through the exhaust ports 2 and the gap where the known piston moving lever 3 is fitted as shown on the left in Fig. 3.

I declare that what I claim is:

1. An internal combustion power rammer or pile driver comprising a cylinder, a head at each end of the cylinder, a rod slidably mounted in the lower head of the cylinder, a rammer foot mounted on the outer end of the said rod, a free piston in the cylinder between the inner end of the said rod and the upper head of the cylinder, said cylinder having in its side wall an exhaust port adapted to be covered or passed in each direction, by the piston, a cylindrical housing on the underside of the crown to the piston, a valve cage secured in the said housing, said piston having a transfer passage through its crown into the said housing, a downwardly directed valve seating around the underside of the said transfer passage, said valve cage having a complementary transfer passage consisting of a number of inclined holes converging towards the lower end and separated at their upper ends by radiating webs to support a valve disc, a valve disc supported thereon and a complementary valve seating and face around the underside of the said transfer passage in the valve cage and on the inner end of the rod.

2. An internal combustion power rammer or pile driver according to claim 1 characterized by a boss in the center of the radiating webs, said boss having a central passage in axial alignment with the lower outlet of the valve cage.

3. An internal combustion power rammer or pile driver comprising a cylinder, a head at each end of the cylinder, a rod slidably mounted in the lower head of the cylinder, a rammer foot mounted on the outer end of the said rod, a free piston in the cylinder between the inner end of the said rod and the upper head of the cylinder, said cylinder having in its side wall an exhaust port adapted to be covered or passed in each direction, by the piston, a housing on the underside of the crown to the piston, a valve cage secured in the said housing, said piston having a transfer passage through its crown into the said housing, a downwardly directed valve seating around the underside of the said transfer passage, said valve cage having a complementary transfer passage extending therethrough, a non-return valve supported in the valve cage, and a complementary valve seating and face around the underside of the said transfer passage in the valve cage and on the inner end of the rod.

4. An internal combustion power rammer or pile driver comprising a cylinder, a head at each end of the cylinder, a rod slidably mounted in the lower head of the cylinder, a rammer foot mounted on the outer end of the said rod, a free piston in the cylinder between the inner end of said rod and the upper head of the cylinder, said cylinder having in its side wall an exhaust port adapted to be covered or passed in each direction, by the piston, a housing on the underside of the crown to the piston, a valve cage secured in the said housing, said piston having a transfer passage through its crown into the said housing, a downwardly directed valve seating around the underside of the said transfer passage, said valve cage having a complementary transfer passage extending therethrough, a non-return disc valve supported in the valve cage, and a complementary valve seating and face around the underside of the said transfer passage in the valve cage and on the inner end of the rod.

5. An internal combustion power rammer or pile driver comprising a cylinder, a head at each end of the cylinder, a rod slidably mounted in the lower head of the cylinder, a rammer foot mounted on the outer end of the said rod, a free piston in the cylinder between the inner end of the said rod and the upper head of the cylinder, said cylinder having in its side wall an exhaust port adapted to be covered or passed in each direction by the piston, a cylindrical housing on the underside of the crown to the piston, a valve cage secured in the said housing, said piston having a transfer passage through its crown into the said housing, a downwardly directed valve seating around the underside of the said transfer passage, said valve cage having a complementary transfer passage extending therethrough, a non-return valve supported in the valve cage, a downwardly projecting tapering valve seating around the underside of the said transfer passage in the valve cage, and a concave annular valve face on the inner end of said rod cooperating with said last mentioned valve seating.

6. An internal combustion power rammer or pile driver comprising a cylinder, a head at each end of the cylinder, a rod slidably mounted in the lower head of the cylinder, a rammer foot mounted on the outer end of the said rod, a free piston in the cylinder between the inner end of the said rod and the upper head of the cylinder, said cylinder having in its side wall an exhaust port adapted to be covered or passed in each direction, by the piston, said piston having a transfer passage through its head, a downwardly directed valve seating in said passage, a non-return valve within the transfer passage cooperating with said valve seating, a valve seating around the underside of the said transfer passage below said non-return valve, and a valve face on the inner end of said rod cooperating with said last mentioned valve seating.

JOACHIM WOLFGANG PHILIPPOVIC.

REFERENCES CITED

The following references are of record in the file of this patent:

UNITED STATES PATENTS

| Number | Name | Date |
|---|---|---|
| 1,834,729 | Pflüger et al. | Dec. 1, 1931 |